United States Patent
Lee et al.

(10) Patent No.: US 10,998,944 B2
(45) Date of Patent: May 4, 2021

(54) SYSTEM AND METHOD FOR APPLYING SMOOTHED BEAMFORMING

(71) Applicant: Samsung Electronics Co., Ltd., Suwon-si (KR)

(72) Inventors: Wook Bong Lee, San Jose, CA (US); Tianyu Wu, Fremont, CA (US); Eunsung Jeon, Hwaseong-si (KR); Sungsoo Kim, Hwaseong-si (KR)

(73) Assignee: Samsung Electronics Co., Ltd.

( * ) Notice: Subject to any disclaimer, the term of this patent is extended or adjusted under 35 U.S.C. 154(b) by 268 days.

(21) Appl. No.: 16/189,156

(22) Filed: Nov. 13, 2018

(65) Prior Publication Data
US 2020/0091970 A1 Mar. 19, 2020

Related U.S. Application Data

(60) Provisional application No. 62/731,702, filed on Sep. 14, 2018.

(51) Int. Cl.
*H04B 17/336* (2015.01)
*H04B 7/0417* (2017.01)
(Continued)

(52) U.S. Cl.
CPC ......... *H04B 7/0417* (2013.01); *H04B 7/0617* (2013.01); *H04B 7/0626* (2013.01);
(Continued)

(58) Field of Classification Search
CPC .. H04B 17/336; H04B 7/0417; H04B 7/0617; H04B 7/0626; H04B 7/0634;
(Continued)

(56) References Cited

U.S. PATENT DOCUMENTS 7,561,632 B1 7/2009 van Zelst et al.
8,306,142 B2 11/2012 Ariyavisitakul
(Continued)

OTHER PUBLICATIONS

M. Sandell, V. Ponnampalam, "Smooth Beamforming for OFDM," IEEE Trans. On Wireless Comm., vol. 8, No. 3, Mar. 2009.
(Continued)

*Primary Examiner* — Omar J Ghowrwal
*Assistant Examiner* — Natali Pascual Peguero
(74) *Attorney, Agent, or Firm* — Innovation Counsel LLP

(57) ABSTRACT

A method in a wireless station in communication with an access point over a communication channel includes receiving a channel estimation matrix; determining a beamforming matrix using the channel estimation matrix, the beamforming matrix being generated for a plurality of down-sampled feedback indices; the beamforming matrix including beamforming weights for one or more antennas associated with the access point, each beamforming weight being a complex value including an amplitude and a phase; setting the phase of the beamforming weight for a last antenna associated with the last feedback index of the beamforming matrix to zero and rotating the phase of each beamforming weight for each of the other antennas; performing smoothing of the beamforming matrix for each feedback index by normalizing each column vector of the beamforming matrix; compressing the smoothed beamforming matrix; and providing the smoothed beamforming matrix as output.

20 Claims, 6 Drawing Sheets

(51) Int. Cl.
*H04B 7/06* (2006.01)
*H04B 7/0452* (2017.01)

(52) U.S. Cl.
CPC ......... *H04B 7/0634* (2013.01); *H04B 17/336* (2015.01); *H04B 7/0452* (2013.01)

(58) Field of Classification Search
CPC .... H04B 7/0636; H04B 7/086; H04B 7/0452; H04L 25/0204
See application file for complete search history.

(56) References Cited

U.S. PATENT DOCUMENTS

| | | | |
|---|---|---|---|
| 8,406,720 B2 | 3/2013 | Na et al. | |
| 8,798,184 B2 | 8/2014 | Su et al. | |
| 8,868,009 B2 | 10/2014 | Wang et al. | |
| 9,059,754 B2 | 6/2015 | Zhang et al. | |
| 2014/0093005 A1* | 4/2014 | Xia | H04B 7/066 375/267 |
| 2016/0359532 A1 | 12/2016 | Cao et al. | |
| 2017/0331534 A1 | 11/2017 | Jiang et al. | |
| 2018/0164874 A1* | 6/2018 | Qiu | G01S 15/36 |

OTHER PUBLICATIONS

C. Shen, M.P. Fitz, "MIMO-OFDM Beamforming for Improved Channel Estimation in 802.11n WLAN," IEEE 802.11-06/0979r0, Proceedings of the Global Telecommunications Conference, Nov. 2006.

A. Davydov, H. Niu, T. Harel and Y. Zhu, "Frequency Selectivity of the Beamforming in Sounding based CL MIMO," http://ieee802.org/16/tgm/contrib/C80216m-09_2761r1.doc, Dec. 30, 2009.

Toby Haynes, "A Primer on Digital Beamforming", Spectrum Signal Processing, dated Mar. 26, 1998, downloaded at http://eclass.uth.gr/eclass/modules/document/file.php/MHX214/Additional%20Material/%21%20A%20Primer%20on%20Digital%20Beamforming.pdf on Oct. 17, 2018.

* cited by examiner

For $ic=2$:FeedbackLength

For ns=1:$N_{ss}$-1

$\text{Corr} = \left| \mathbf{v}_{ns,ic-1}^{H} [\mathbf{v}_{ns,ic} \quad \cdots \quad \mathbf{v}_{N_{ss},ic}] \right|$ $\text{Idx} = \text{sort}(\text{Corr})$     where sort(X) provides indices corresponding to largest to smallest value of Corr $\mathbf{V}_{ic}(:, ns:N_{ss}) = \mathbf{V}_{ic}(:, \text{Idx} + ns - 1)$

Fig. 7

SYSTEM AND METHOD FOR APPLYING SMOOTHED BEAMFORMING

CROSS REFERENCE TO RELATED APPLICATIONS

This application claims priority to U.S. Provisional Patent Application No. 62/731,702, entitled SYSTEM AND METHOD APPLYING SMOOTHED BEAMFORMING ALGORITHM, filed Sep. 14, 2018, which is incorporated herein by reference for all purposes.

FIELD OF THE DISCLOSURE

The present disclosure relates to wireless communication and, in particular, to a system and method for generating smoothed beamforming feedback matrix at a beamformee for feedback to an access point.

BACKGROUND OF THE DISCLOSURE

The IEEE 802.11ac wireless local area network (WLAN) standard is used in implementing very high throughput (VHT) WLANs. In VHT-WLAN, 256-QAM modulation, the extension of bandwidth up to 160 MHz, and multiple-input multiple-output (MIMO) transmission up to 8 streams are defined to provide 6.9 Gbps data rate. Furthermore, the IEEE 802.11n and beyond (e.g. IEEE 802.11n, IEEE 802.11ac, and IEEE 802.11ax) wireless local area network (WLAN) standard has adopted beamforming (BF) schemes to improve spectral efficiency and throughput with multiple antennas. To design the transmit beam, a channel sounding process to feedback channel state information (CSI) is implemented. The beamformer uses the channel state information to precisely steer the transmitter's transmitted energy toward the receiver.

More specifically, the IEEE 802.11ac WLAN standard includes closed-loop beamforming (BF) schemes for single-user beamforming (SU-BF) methods and multiuser beamforming (MU-BF) methods to improve spectral efficiency with a given channel condition. For these beamforming transmissions, an access point (AP) sends a sounding packet including only preambles and receives a compressed beamforming frame with modified downlink channel information from the stations (STAs). For instance, with the beamforming thus applied, in MU-BF mode, an access point can transmit multiple data streams simultaneously to multiple stations.

SUMMARY OF THE DISCLOSURE

The present disclosure discloses a device and method for controlling a connected device in a mobile device, substantially as shown in and/or described below, for example in connection with at least one of the figures, as set forth more completely in the claims.

These and other advantages, aspects and novel features of the present disclosure, as well as details of an illustrated embodiment thereof, will be more fully understood from the following description and drawings.

In embodiments of the present disclosure, a method in a wireless station deployed in a wireless local area network and in communication with an access point over a communication channel, the access point transmitting using a plurality of antennas includes receiving a channel estimation matrix characterizing the communication channel, the channel estimation matrix being associated with a plurality of feedback indices relating to respective plurality of subcarriers; determining a beamforming matrix using the channel estimation matrix, the beamforming matrix being generated for a plurality of down-sampled feedback indices being a subset of the plurality of feedback indices; the beamforming matrix including beamforming weights for one or more antennas associated with the access point, each beamforming weight being a complex value including an amplitude and a phase; setting the phase of the beamforming weight for a last antenna associated with the last row index of the beamforming matrix to zero and rotating the phase of each beamforming weight for each of the other antennas; performing smoothing of the beamforming matrix for each feedback index by normalizing each column vector of the beamforming matrix; compressing the smoothed beamforming matrix; and providing the smoothed beamforming matrix as output.

In embodiments of the present disclosure, a wireless station deployed in a wireless local area network and in communication with an access point over a communication channel, the access point transmitting using a plurality of antennas, the wireless station including a processor; and a memory coupled with the processor, wherein the memory is configured to provide the processor with instructions which when executed cause the processor to: receive a channel estimation matrix characterizing the communication channel, the channel estimation matrix being associated with a plurality of feedback indices relating to respective plurality of subcarriers; determine a beamforming matrix using the channel estimation matrix, the beamforming matrix being generated for a plurality of down-sampled feedback indices being a subset of the plurality of feedback indices; the beamforming matrix including beamforming weights for one or more antennas associated with the access point, each beamforming weight being a complex value including an amplitude and a phase; set the phase of the beamforming weight for a last antenna associated with the last row index of the beamforming matrix to zero and rotating the phase of each beamforming weight for each of the other antennas; perform smoothing of the beamforming matrix for each feedback index by normalizing each column vector of the beamforming matrix; compress the smoothed beamforming matrix; and provide the smoothed beamforming matrix as output.

BRIEF DESCRIPTION OF THE DRAWINGS

Various embodiments of the present disclosure are disclosed in the following detailed description and the accompanying drawings.

FIG. 7 illustrate a pseudocode which can be used to implement the vector swapping operation in some examples.

DETAILED DESCRIPTION

According to embodiments of the present disclosure, a beamforming matrix generation system and method is implemented at a beamformee to generate a smoothed beamforming feedback matrix which can be fed back to a beamformer for performing beamforming on the transmitted beams. In some embodiments, the beamforming matrix generation system and method obtains a beamforming feedback vector or matrix based on a beamforming algorithm and applying down-sampled subcarrier feedback indices. The beamforming matrix generation system and method may further perform vector swapping, set last antenna's phase equals to zero while rotating other antennas' phase accordingly, apply smoothing and compression. The beamforming matrix generation system and method of the present disclosure addresses performance limitation issues of conventional wireless systems, such as small power issue, quantization issue, and vector swapping issue.

In some embodiments, the beamforming matrix generation system and method of the present disclosure is implemented in a wireless station to provide the medium access controller of an access point with compressed beamforming matrices and signal-to-noise ratio (SNR) estimates for specific data subcarriers or subcarrier groups to support beamforming feedback. In one example, the beamforming matrix generation system and method of the present disclosure is implemented in wireless communication systems constructed under the IEEE 802.11n standard and beyond. Furthermore, the beamforming matrix generation system and method of the present disclosure can be applied to support both single-user multiple-input multiple-output (SU-MIMO) and multi-user multiple-input multiple-output (MU-MIMO) Wi-Fi operation. MIMO wireless systems improve data rate by transmitting multiple spatial streams in parallel. The data rate can be further enhanced by using orthogonal frequency division multiplexing (OFDM) or similar techniques within each spatial stream.

MIMO communication systems often employ beamforming to improve receiver performance. Beamforming operates by directing or steering the transmit beam to the receiver to improve the receive power and the signal to noise ratio (SNR) at the receiver. In particular, beamforming changes the directionality of the antennas (transmit and/or receive antennas) to achieve spatial selectivity and thereby improves the receive power and the SNR at the receiver. Beamforming is sometimes referred as beam steering. In general, any device that shapes its transmitted frames is called a beamformer and a receiver of these frames is called a beamformee.

System Overview

Figure 1:
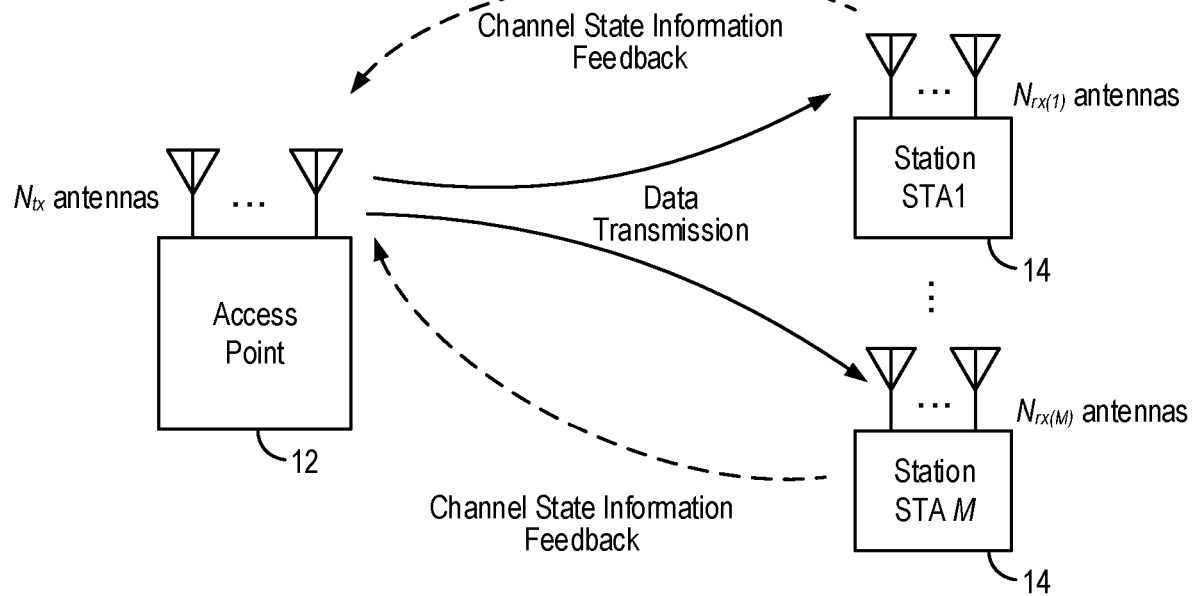
FIG. 1 is a system diagram illustrating an environment in which the beamforming system and method of the present disclosure can be applied in some examples.

FIG. 1 is a system diagram illustrating an environment in which the beamforming system and method of the present disclosure can be applied in some examples. Referring to FIG. 1, a wireless system 10, which can be a wireless local area network (WLAN) implemented using any of the IEEE 802.11 standard, includes an access point (AP) 12 with $N_{tx}$ number of antennas and one or more wireless stations (STAs) 14, each equipped with one or more antennas. In the present illustration, the wireless system 10 includes M wireless stations, each wireless station equipped with respective $N_{rx(b)}$ number of antennas where b is 1 or more, b denotes the wireless stations and has a value of 1 to M. In particular, the wireless stations may have the same number of antennas or the wireless stations may each have a different number of antennas. It is not necessary that all the wireless stations have the same number of antennas. In some cases, the wireless stations are implemented using a single antenna due to space and cost considerations. In SU-BF (single-user beamforming) mode, the AP 12 sends data packets to one STA 14 after channel sounding. In MU-BF (multi-user beamforming), the AP 12 transmits data packets with multiple destination STAs 14 after receiving the channel state information from the multiple wireless stations.

More specifically, IEEE 802.11 standards specify explicit beamforming where a channel sounding process is used to receive channel state information (CSI) feedback from a receiver to a transmitter. For instance, the access point 12 sends a sounding packet, also referred to as a null data packet (NDP), including only preambles and no data to a wireless station 14. The wireless station 14, upon receiving the null data packet, performs channel estimation and feedback compressed channel state information to the access point 12. The access point (the transmitter) receives the compressed beamforming frame including the channel state information and uses the information to shapes its transmitted beam so as to precisely steer the AP's transmitter's transmitted energy toward the wireless station (the receiver).

To improve channel estimation performance, wireless receivers sometimes perform channel smoothing on the estimated channel. In the present description, a wireless channel is said to be "smooth" when the subcarrier channel coefficients are correlated across frequency. That is, the frequency response of the wireless channel has no discontinuities or sudden changes. If the channel is smooth, interpolation-based channel estimation can be applied to improve the channel estimation performance.

Wireless channel is itself smooth. However, in some cases, such as when the beamforming is applied, the smoothness of the channel can be broken. Performing channel smoothing on a channel with broken smoothness can actually degrade the channel estimation. Accordingly, under IEEE801.11 standards, the access point (as the beamformer) indicates explicitly to the wireless station (as the beamformee) whether a transmitted data packet has been beamformed or whether the wireless station should perform channel smoothing. The wireless station can thus determine if it should apply channel smoothing during the channel estimation operation based on the indication from the beamformer. Channel estimation performance may be degraded when channel smoothing is not applied.

In embodiments of the present disclosure, the beamformee generates the beamforming feedback vector or matrix by applying a beamforming algorithm to the channel estimation matrix. Various beamforming algorithms are known in the art to generate the beamforming vector or matrix from the channel estimation matrix. In some examples, the beamforming matrix generation system and method may use singular value decomposition (SVD) to generate the beamforming vector/matrix. In other examples, the beamforming matrix generation system and method may use geometric mean decomposition (GMD). Other beamforming algorithms, presently known or to be developed, may also be used in other examples of the present disclosure.

In the present description, the beamforming feedback matrix may be referred to as a beamforming matrix and typically includes one or more column vectors, also referred to as feedback vectors, beamforming feedback vectors, or beamforming vectors. It is understood that a vector refers to a single row or a single column of a matrix. In the following description, references to a "beamforming matrix" may include a beamforming matrix or a beamforming vector, or one or more column vectors forming the beamforming matrix.

Factors that break the smoothness of a beamformed channel include eigenvector subspace swapping, phase discontinuity caused by beamforming algorithm, and quantization error.

(1) Eigenvector Subspace Swapping

In eigenmode beamforming, the beamforming weights are the right singular vectors $V_k$ of the channel $H_k$, where $V_k$ denotes the J singular vectors corresponding to the J largest singular values of the channel $H_k$. In some cases, arranging the beamforming weights from the largest singular values to the smallest may result in vector swapping between adjacent subcarriers.

For example, in the case of two subcarriers SC1 and SC2 each feeding back two feedback vectors V1 and V2. In the conventional beamforming method, for each subcarrier, the vectors are arranged so that the vector with the highest singular value is listed first. In this case, subcarrier SC1 may end up with a feedback matrix of [V1, V2] while subcarrier SC2 may end up with feedback matrix of [V2, V1]. When the positions of the feedback vectors are swapped, the channel smoothness can become broken.

(2) Phase Discontinuity Caused by Beamforming Algorithm

A beamforming weight is a complex weight represented by the amplitude and the phase shift to be applied for each antenna. One factor that contributes to the broken smoothness is phase discontinuity. Under IEEE802.11 standard, a column-wise phase shift is to be applied to the as-computed beamforming matrix to make the last antenna's phase equal to zero and the weight equal to non-negative real numbers.

When the last antenna's beamforming weight is small, phase discontinuity can result. For example, assume the number of transmit antenna at a beamformer is 2 ($N_{tx}=2$) and number of receive antenna at a beamformee is 1 ($N_{rx}=1$), then the frequency channel response H may be expressed as $H=[|h_{11}|e^{j\theta_1}|h_{12}|e^{j\theta_2}]$, and the corresponding beamforming vector V is given by:

$$V = H^* = \begin{bmatrix} |h_{11}|e^{-j\theta_1} \\ |h_{12}|e^{-j\theta_2} \end{bmatrix} = \frac{e^{-j\theta_2}}{D} \underbrace{\begin{bmatrix} e^{j(\theta_2-\theta_1)} & 0 \\ 0 & 1 \end{bmatrix} \begin{bmatrix} |h_{11}| \\ |h_{12}| \end{bmatrix}}_{\tilde{v}}$$

When the last row of the beamforming vector V, that is, the last transmit antenna's beamforming weight, is too small, $\||h_{12}|e^{j\theta_2}\| \approx 0$, then sudden change of the phase ($\theta_2$) occurs between subcarriers. For example, suppose the following two possible channel estimation results are obtained: ε and −ε where ε is small number. Even though difference between these two values are very small, the phase of these two values are totally different (180°). As a result, channel smoothness is broken in $|h_{11}|e^{j(\theta_1\theta_2)}$.

When beamformee feeds back channel station information including $\theta_2$, this problem can be resolved. However, when the number of receive antennas at the beamformee is more than 1 ($N_{rx}>1$), singular value decomposition (SVD) is used to obtain the beamforming matrix/vector. Since singular vector is rotational invariant, SVD algorithm may provide $e^{j\theta}v$ with arbitrary θ in different subcarrier. In this case, feeding back $\theta_2$ does not help.

(3) Quantization Error

Quantization or compression of the beamforming matrix can also result in broken smoothness in the channel. For example, before quantization, a set of beamforming weights may have both acceptable correlation and phase angle values. However, after quantization, the phase angle can become quite high while the correlation is closed to 1. This can mean that all of antenna's weight is rotated to a certain degree which breaks channel smoothness.

Embodiments of the beamforming matrix generation system and method of the present disclosure overcome the drawbacks of the conventional solutions.

Device Overview

Figure 2:
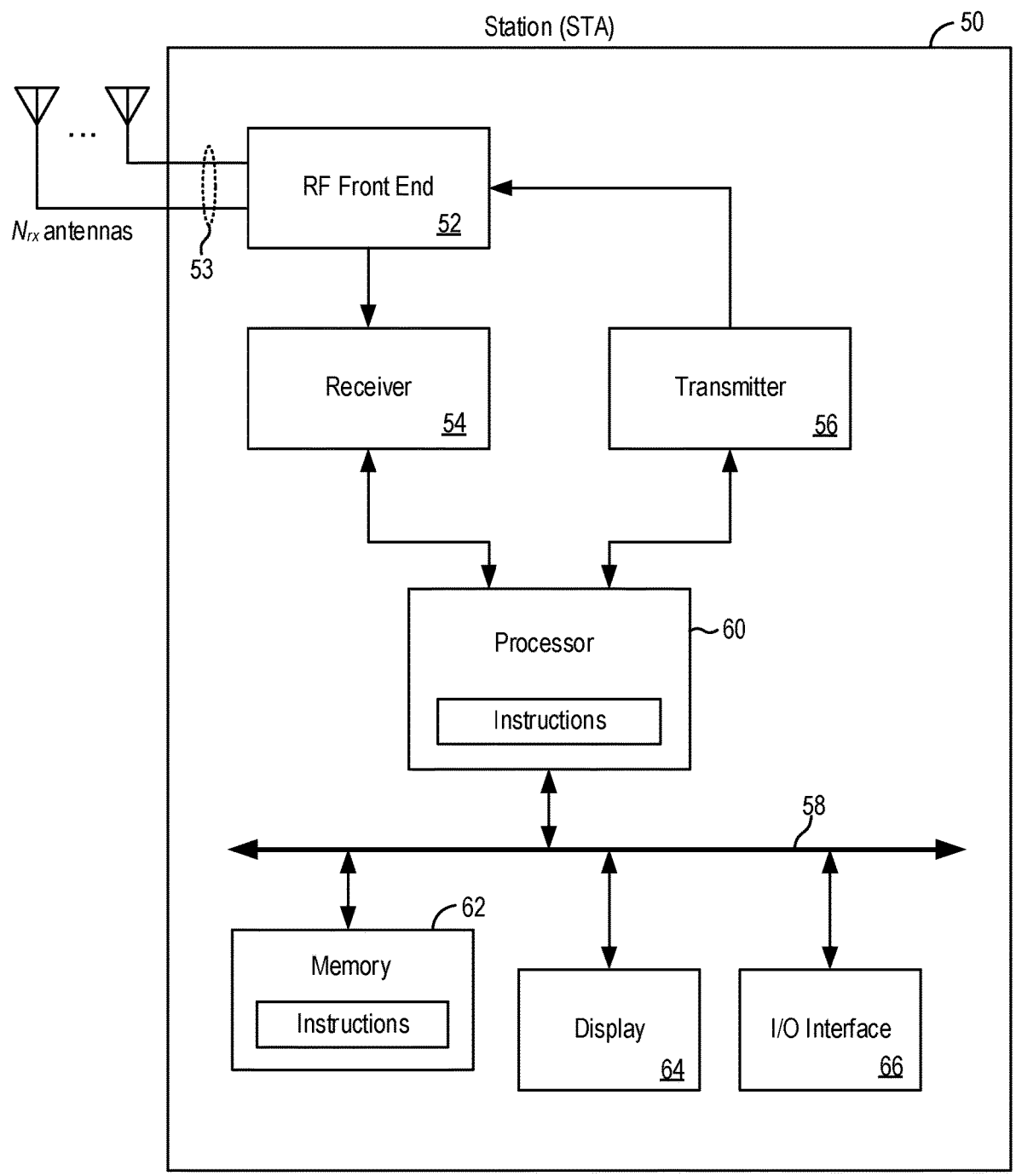
FIG. 2 is a schematic diagram of a wireless station in some examples.

FIG. 2 is a schematic diagram of a wireless station in some examples. FIG. 2 illustrates an exemplary configuration of a wireless station in some embodiments. It is understood that FIG. 2 is only representative of a generic wireless station and that in actual implementations, the wireless station may use various configurations and may include other elements not shown in FIG. 2. Referring to FIG. 2, a wireless station (STA) 50 includes one or more antennas 53 coupled to a radio frequency (RF) front end 52. A receiver circuit 54 and a transmitter circuit 56 are coupled to the RF front end 52 to receive signals from and transmit signals to the antennas 53.

The wireless station 50 includes a processor 60 for controlling the operation of the wireless station. The processor 60 executes instructions stored therein to perform various operations, including beamforming matrix generation. The processor 60 is in communication with a system bus 58. Through the system bus 58, the processor 60 is in communication with one or more system components of the wireless station 50. For example, the wireless station 50 may include a memory 62 for storing instructions and data, a display 64 and an I/O interface 66 for interfacing with a user or for providing status indication.

Beamforming Overview

In embodiments of the present disclosure, the beamformee generates the beamforming feedback matrix and feedback to the beamformer the beamforming feedback matrix for each subcarrier and other information as the channel state information. In some embodiments, a wireless station is the beamformee configured to generate a compressed beamforming matrix and feed back the compressed beamforming matrix to an access point as the beamformer. The access point, as the beamformer, receives the compressed beamforming matrix and reconstructs the beamforming matrix so as to perform beamforming or beam steering. That is, the access point modifies its antennas so as to steer the transmit beam towards the wireless station based on the beamforming matrix received from the wireless station.

Figures 3, 4:
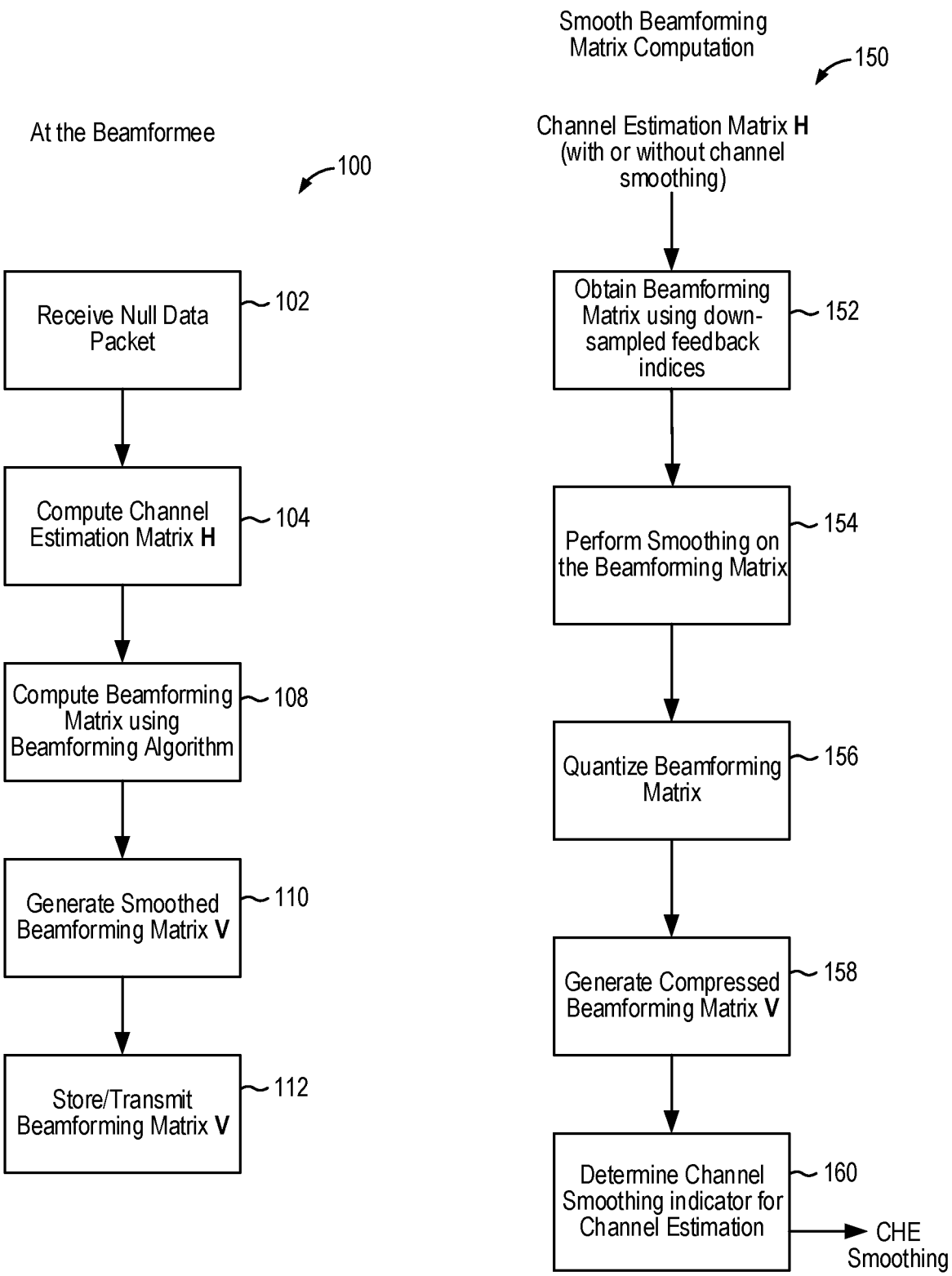
FIG. 3 is a flowchart illustrating the beamforming matrix generation method implemented in a beamformee in embodiments of the present disclosure.
FIG. 4 is a flowchart illustrating a smoothed beamforming matrix computation method in some embodiments.

FIG. 3 is a flowchart illustrating the beamforming matrix generation method implemented in a beamformee in embodiments of the present disclosure. In some embodiments, the beamformee is a wireless station in a WLAN in communication with an access point as the beamformer. Referring to FIG. 3, a beamforming matrix generation method 100 implemented in the beamformee receives a null data packet including a preamble and no data (102). The method 100 performs channel estimation by computing a channel estimation matrix H (104). The channel estimation matrix H has $N_{tx}$ number of columns, corresponding to $N_{tx}$ number of transmit antennas at the beamformer, and $N_{rx}$ number of rows, corresponding to $N_{rx}$ number of receive antennas at the beamformee.

With the channel estimation matrix H thus determined, the method 100 computes the beamforming matrix using a beamforming algorithm (108). In one embodiment, the beamforming matrix is generated by decomposing the channel estimation matrix H using singular value decomposition (SVD). In another embodiment, the beamforming matrix is generated by decomposing the channel estimation matrix H using geometric mean decomposition (GMD). The method 100 perform smoothing to generate a smoothed beamforming matrix V (110). The smoothed beamforming matrix V may be stored in the wireless station and transmitted to the beamformer as the beamforming feedback signal (112). In this manner, the beamforming matrix generating method 100 generates the beamforming feedback matrix V at the beamformee to be fed back to the beamformer to perform beamforming.

Smoothed Beamforming Matrix Computation Overview

FIG. 4 is a flowchart illustrating a smoothed beamforming matrix computation method in some embodiments. In particular, FIG. 4 illustrates in more details the smoothed beamforming matrix computation steps implemented at the beamformee in the method 100 of FIG. 3 in some embodiments. Referring to FIG. 4, a smoothed beamforming matrix computation method 150 receives the channel estimation matrix H as an input. The channel estimation matrix H may or may not have been smoothed by channel smoothing. The method 150 obtains a beamforming matrix or vector using a beamforming algorithm, such as SVD or GMD, and using down-sampled subcarrier feedback indices (152). For example, when SVD is used as the beamforming algorithm, the beamforming feedback matrix is formed by the right singular vector of the channel estimation matrix H. Furthermore, in the present embodiment, the beamforming matrix is formed by down-sampling the subcarriers of the channel, as will be explained in more detail below.

The method 150 then performs smoothing on the beamforming feedback matrix thus obtained (154). The method 150 then quantize the beamforming feedback matrix (156). The method 150 thus generates a compressed and smoothed beamforming matrix V (158).

In some embodiments, the method 150 may further analyze the compressed beamforming matrix V and determine a channel smoothing indicator for the channel estimation operation (160). The method 150 generates locally a channel smoothing indicator "CHE Smoothing" which is fed back to the channel estimation operation to instruct the channel estimation operation whether to carry out channel smoothing on the incoming data packets after channel estimation.

In the conventional beamforming methods, the beamformee may receive an indication from the beamformer that the transmitted beam has been beamformed and therefore the beamformee should not perform channel smoothing on the data packets. Alternately, in the conventional beamforming methods, the beamformee may receive an indication from the beamformer to perform channel smoothing or not perform channel smoothing on the receiving data packets and the beamformee acts accordingly.

In method 150 of the present disclosure, the beamforming matrix generated at the beamformee is evaluated to provide an indication of whether channel smoothing can be performed (step 160). In particular, the channel smoothing indicator (CHE Smoothing) is fed back to the channel estimation operation to inform the channel estimation method to perform channel smoothing on the received data packets, regardless of whether the received data packets have been beamformed. The analysis step 160 to generate the channel smoothing indicator is optional and may be omitted in other embodiments of the present disclosure.

Figure 5:
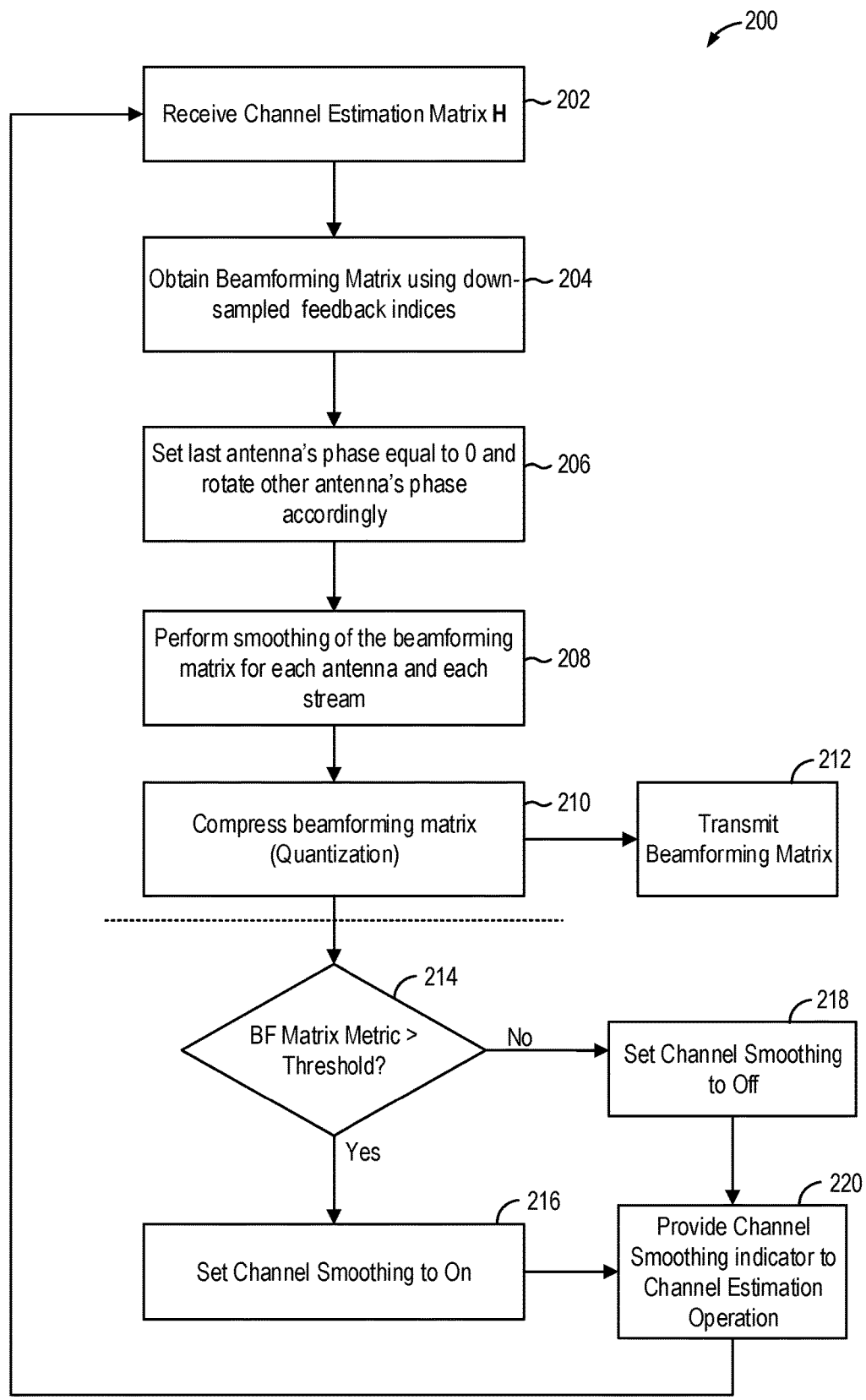
FIG. 5 is a flowchart illustrating a smoothed beamforming matrix computation method in some embodiments.

FIG. 5 is a flowchart illustrating a smoothed beamforming matrix computation method in some embodiments. The smoothed beamforming matrix computation method is implemented in a beamformee to generate the beamforming matrix which is fed back to the beamformer to enable the beamformer to perform beamforming.

Referring to FIG. 5, a smoothed beamforming matrix computation method 200 receives a channel estimation matrix H as input (202). The method 200 obtains a beamforming matrix V using a beamforming algorithm and using down-sampled subcarrier feedback indices (204). For instance, the method 200 decomposes the channel estimation matrix H using a beamforming algorithm to obtain the beamforming matrix. In some embodiments, the method 200 decomposes the channel estimation matrix H using SVD or GMD as the beamforming algorithm.

For example, when the method 200 uses SVD to decompose the channel estimation matrix H, the beamforming matrix V is formed by the right singular vectors of the decomposed channel estimation matrix H. As described above, the channel estimation matrix H has $N_{tx}$ number of columns, corresponding to $N_{tx}$ number of transmit antennas at the beamformer, and $N_{rx}$ number of rows, corresponding to $N_{rx}$ number of receive antennas at the beamformee. Meanwhile, the beamforming matrix V is formed by the first $N_{SS}$ columns of the right singular matrix of the decomposed channel estimation matrix having the largest singular values, where $N_{SS}$ denotes the number of spatial streams for feedback. Thus, the beamforming matrix V has $N_{SS}$ columns or $N_{SS}$ vectors. The beamforming matrix V has $N_{tx}$ number of rows, where $N_{tx}$ is the number of antennas at the beamformer.

In practice, the channel estimation matrix H is computed for each subcarrier of the channel, each subcarrier being associated with a feedback index n. More specifically, a beamformer with $N_{tx}$ number of transmit antennas transmits to a beamformee with $N_{rx}$ number of receive antennas $N_{SS}$ number of spatial streams in parallel using $N_C$ number of OFDM subcarriers. Each subcarrier is identified or associated with a feedback index "n". In embodiments of the present disclosure, the method 200 forms the beamforming matrix V using down-sampled feedback indices. Instead of using smoothing algorithm, down-sampling is performed to reduce the possibility of broken smoothness in the channel. In other words, instead of generating beamforming matrix for each subcarrier of the channel, the method 200 generates a beamforming matrix for a subset of the subcarriers of the channel associated with the down-sampled feedback index ic (204).

In some embodiments, the method 200 down-samples the feedback indices by a down-sampling ratio K. In one example, according to IEEE 802.11ac 20 MHz compressed beamforming report case, there are 56 subcarriers to report ($N_C$=56) and the method 200 uses a down-sampling ratio K=4. The beamforming matrix V is therefore down-sampled to 14 subcarriers using the down-sampling ratio of 4.

More specifically, a beamforming matrix V formed using a down-sampled subcarrier index ic is given as:

$$V_{ic}=[v_{1(ic)} \ldots v_{NSS(ic)}]$$

where $v_{ns(ic)}$ is a beamforming vector corresponding to ns-th spatial stream at the down-sampled subcarrier index ic. That is, the down-sampled subcarrier index ic is a subset of the feedback index n associated with the OFDM subcarriers of the transmit signal. Each beamforming vector has $N_{tx}$ number of rows, $N_{tx}$ being the number of antennas at the beamformer. In one embodiment, when SVD beamforming algorithm is used, the beamforming matrix $V_{ic}$ is a right singular matrix corresponding to first to $N_{SS}$ largest singular values of the down-sampled subcarrier's channel matrix $H_{ic}$.

The beamforming matrix V includes an array of beamforming weights where each beamforming weight is a complex weight value including an amplitude and a phase shift to be applied for each antenna at the beamformer.

With the down-sampled beamforming matrix $V_{ic}$ thus obtained, the method 200 proceeds to set the last antenna's phase equals to zero and rotate other antennas' phase accordingly (206). In the present description, the last antenna refers to the last row index of the beamforming matrix V. As described above, a beamforming matrix includes an array of beamforming weights where each beamforming weight is a complex weight represented by the amplitude and the phase shift to be applied for each antenna. According to IEEE 802.11 compressed beamforming feedback, the phase of the beamforming weight of the last antenna is set to zero and the phase of the beamforming weights of other antennas is rotated with respect to a phase angle of the last antenna. In some embodiments, the antenna rotation can be implemented using known antenna rotation algorithms.

The method 200 then performs smoothing on the beamforming feedback matrix thus obtained (208). Because the beamforming matrix has been down-sampled, the method 200 performs smoothing to fill out the other subcarriers so as to guarantee channel smoothness. In some embodiments, the method 200 performs smoothing for each antenna and each spatial stream. Furthermore, in one embodiment, the method 200 performs smoothing for each antenna and each data stream by normalizing each column vector.

In one embodiment, the method 200 generates a smoothed beamforming feedback matrix using the original feedback granularity, that is, a down-sampled ratio of 1. Accordingly, the method 200 provides beamforming matrix for the full set of subcarrier for feedback. The method 200 may further make the resultant smoothed beamforming matrix into a unitary matrix by normalizing each column vector to unit power and making each column vector orthogonal. In one embodiment, the method 200 uses the Gram-Schmidt orthogonalization. As a result, the method 200 generates a smoothed beamforming matrix V including beamforming vectors for all subcarriers.

The method 200 then compresses or quantizes the smoothed beamforming feedback matrix (210). In embodiments of the present disclosure, the method 200 applies compression or quantization techniques known in the art. The compressed beamforming matrix can then be transmitted to the beamformer (212).

In the present embodiment, the method 200 further evaluates the compressed beamforming matrix and determines whether channel smoothing can be performed for the data packets even if the beamformee receives beamformed data packets. The method 200 evaluates a metric for the beamforming matrix and determines if the metric is greater than a predetermined threshold (214). In one embodiment, the metric can be the sign-to-noise ratio of the beamforming matrix. In another embodiment, the metric can be a correlation value. In another embodiment, the metric can be the number of spatial streams for feedback.

In embodiments of the present disclosure, the method 200 uses the evaluation of the metric to set a channel smoothing indicator which is coupled to the channel estimation operation. The channel smoothing indicator is fed back to the channel estimation operation to instruct the channel estimation method to perform channel smoothing on the received data packets, regardless of whether the received data packets have been beamformed. In one embodiment, if the beamforming matrix metric exceeds a given threshold, the channel smoothing indicator is set to On (216). On the other hand, if the metric computed for the beamforming matrix is at or below the threshold, the channel smoothing indicator is set to Off (218). The method 200 then provides the channel smoothing indicator to the channel estimation operation (220). The channel estimation operation will be configured to perform channel smoothing for incoming data packets when the channel smoothing indicator is set to On. The channel estimation operation will be configured to perform channel smoothing according to information provided by the beamformer when the channel smoothing indicator is set to Off. That is, when the channel smoothing indicator is set to Off, then the channel estimation will not perform channel smoothing when the beamformer indicates to the beamformee that the transmitted data packet has been beamformed and will perform channel smoothing when the beamformer indicates to the beamformee that the transmitted data packet has not been beamformed.

The method 200 completes the computation of the beamforming matrix and the method 200 may be repeated when another channel estimation matrix is received from the channel estimation operation.

In some embodiments, the metric of the beamforming matrix can be compared with a threshold having the opposite polarity—that is, channel smoothing indicator is set to On in response to the metric being equal to or small than the threshold and to Off in response to the metric being greater than the threshold. In embodiments of the present disclosure, the threshold used for the beamforming matrix metric can have variable values. In particular, different threshold may be used for different SNR region. The method 200 in FIG. 5 is illustrative only and not intended to be limiting.

In one embodiments, the beamforming matrix metric is a correlation value of the beamforming weights between neighboring subcarriers. In the present embodiment, the correlation value is computed between the beamforming weights of neighboring down-sampled subcarriers. After compression, if the minimum correlation $$\left( \min_{\forall ns, \forall ic} |v_{ns,ic-1}^H v_{ns,ic}| \right)$$

is smaller than a threshold or the maximum phase angle $$\left( \min_{\forall ns, \forall ic} \angle v_{ns,ic-1}^H v_{ns,ic} \right)$$

is larger than a threshold (214), then method 200 set the channel smoothing indicator (CHE Smoothing) to off (218). Otherwise, the method 200 set the channel smoothing indicator (CHE Smoothing) to on (216). The channel smoothing indicator (CHE Smoothing) is stored locally at the beamformee to use in its own channel estimation operation.

In embodiments of the present disclosure, the smoothed beamforming matrix computation method 200 generates the channel smoothing indicator to instruct the channel estimation operation to carry out channel smoothing if certain requirement for channel smoothing is met. Thus, the decision to carry out channel smoothing or not is decoupled from the instruction from the beamformer. Even if the beamformer indicates the transmitted packets have been beamformed, the beamformee may still perform channel smoothing after channel estimation when the conditions evaluated by the metric are met. In this manner, optimal performance can be obtained at the beamformee.

In particular, setting the channel smoothing indicator locally based on the beamforming matrix evaluation realizes advantages over conventional solutions. First, without the use of thresholds, the beamformee may have to apply channel smoothing all the time. This will degrade performance when channel smoothing should not be applied under certain conditions. Second, if channel smoothing is not applied at all, then performance is also degraded. The channel smoothing indicator enables the beamformee to apply channel smoothing intelligently so that channel smoothing is applied when channel smoothing will improve the performance of the wireless station.

Figure 6:
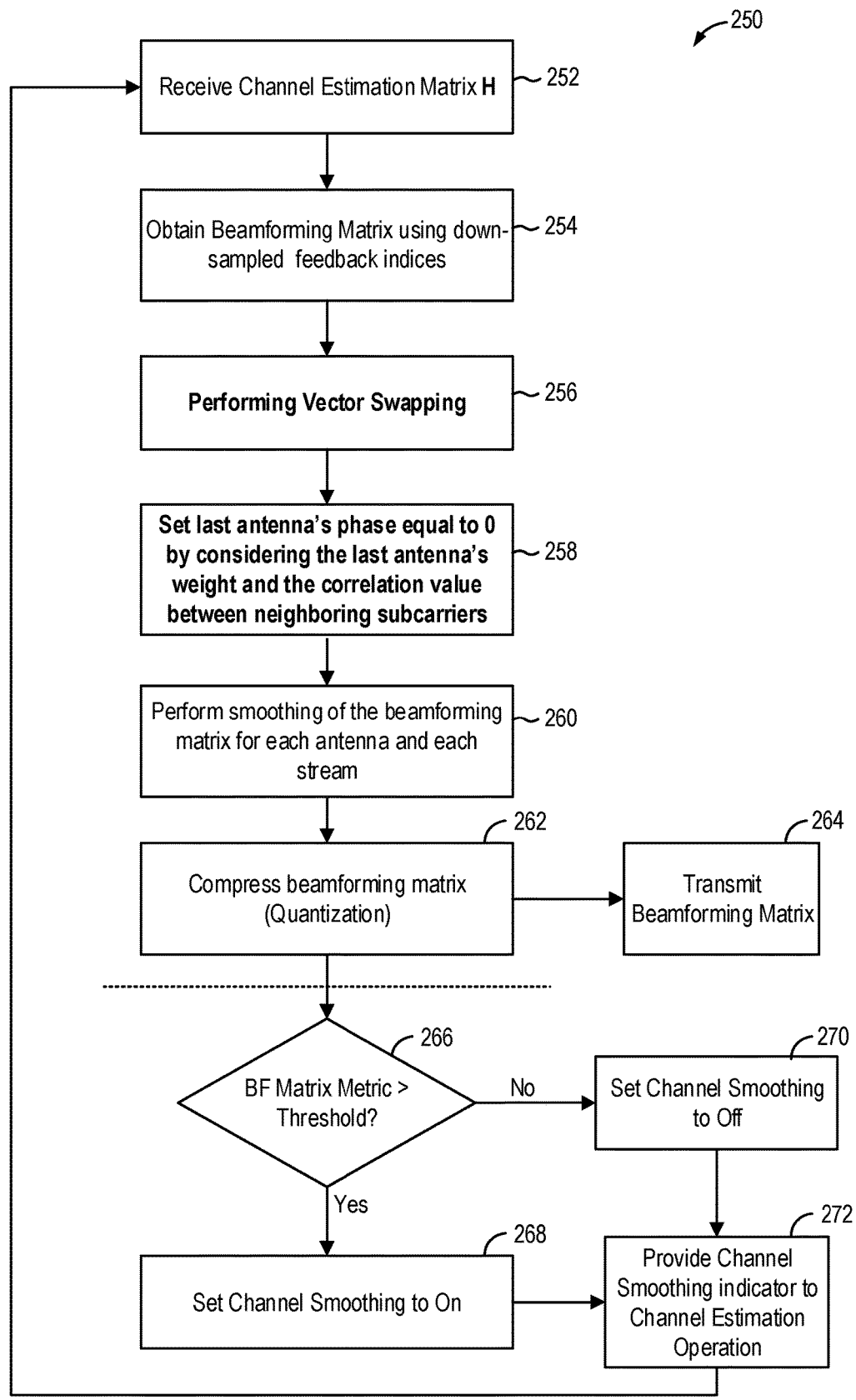
FIG. 6 is a flowchart illustrating a smoothed beamforming matrix computation method in some embodiments.

FIG. 6 is a flowchart illustrating a smoothed beamforming matrix computation method in some embodiments. The smoothed beamforming matrix computation method is implemented in a beamformee to generate the beamforming matrix which is fed back to the beamformer to enable the beamformer to perform beamforming. The smoothed beamforming matrix computation method is similar to the method 200 in FIG. 5 and similar steps will not be further described. In particular, the smoothed beamforming matrix computation method of FIG. 6 includes the additional step of performing vector swapping and also uses an inventive method to set the phase of the last antenna to zero, as will be described in more detail below.

Referring to FIG. 6, a smoothed beamforming matrix computation method 250 receives a channel estimation matrix H as input (252). The method 200 obtains a beamforming matrix V using a beamforming algorithm and using down-sampled subcarrier feedback indices (254). As described above, the method 250 may decompose the channel estimation matrix H using a beamforming algorithm, such as SVD, to obtain the beamforming matrix. The method 250 down-samples the subcarrier feedback indices by a down-sampling ratio K. That is, instead of generating beamforming matrix for each subcarrier of the channel, the method 200 generates a beamforming matrix for a subset of the subcarriers of the channel.

The method 250 then performs vector swapping (256). As described above, channel smoothness can be affected when the feedback vectors for two subcarriers are swapped. In embodiments of the present disclosure, vector swapping is carried out to guarantee higher correlation between subcarriers for the same spatial stream. Vector swapping is applied in the case when there are more than one spatial stream, that is $N_{SS} > 1$. In the case the number of spatial streams is greater than 1, the method 250 computes the correlation between neighboring down-sampled subcarriers across all the spatial streams. For each subcarrier ic, the method 250 then places column vector of the beamforming matrix which shows the largest correlation with respect to column vector of the neighbor down-sampled subcarrier having index ic−1. In the conventional method, for each subcarrier, the beamforming matrix usually arranges the feedback vectors so that the vector with the largest singular value is listed first. However, in embodiments of the present disclosure, the method 250 evaluates the correlation of a column vector of one subcarrier relative to the column vector of a neighbor down-sampled subcarrier and arranges the column vector based on the correlation between adjacent down-sampled subcarriers. FIG. 7 illustrates a pseudocode which can be used to implement the vector swapping operation in some embodiments of the present disclosure.

In one example, the beamforming matrix includes two neighboring subcarriers SC1 and SC2. The beamforming matrix for subcarrier SC1 may be [V1, V2, V3] in the order of decreasing singular values while the beamforming matrix for SC2 may be [V2, V1, V3] in the order of decreasing singular values. That is, subcarrier SC1 has vector V1 having the largest singular value while subcarrier SC2 has vector V2 having the largest singular value. In this case, channel smoothness may be broken due to the vector swapping between the two neighboring subcarriers. However, in embodiments of the present disclosure, the method 250 applies vector swapping operation to arrange the feedback vectors based on correlation between neighboring subcarriers. Accordingly, the method 250 will generate beamforming matrices for subcarriers SC1 and SC2 that are both [V1, V2, V3]. In this manner, channel smoothness can be maintained.

With the down-sampled beamforming matrix $V_{ic}$ thus obtained and with vector swapping applied, the method 250 proceeds to set the last antenna's phase equals to zero and rotate other antennas' phase accordingly (258). In the present description, the last antenna refers to the last row of the beamforming matrix. The method 250 applies a novel technique to set the last antenna's phase to zero. In particular, the method 250 considers the magnitude or amplitude of the beamforming weight of the last antenna. In the case that the amplitude of the beamforming weight is small, that is, the amplitude of beamforming weight of the last antenna is less than a weight threshold, the method 250 aligns the phase of all the antennas to the phase associated with the antenna having the largest amplitude in the beamforming weight. The method 250 then set the last antenna's phase value to zero by setting the phase value of the last antenna to zero without further rotating the other antenna's phase values.

As described above, a beamforming matrix includes an array of beamforming weights where each beamforming weight is a complex weight represented by an amplitude and a phase to be applied for each antenna. In the present description, references to the "beamforming weight" refer to the amplitude of the beamforming weight with the understanding that the beamforming weight also has associated with it a phase angle. Furthermore, in the present description, the amplitude of the beamforming weight is sometimes referred to as the magnitude of the beamforming weight.

In embodiments of the present disclosure, the method 250 evaluates the amplitude or magnitude of the last antenna's beamforming weight to determine the phase rotation of the beamforming weights of the antennas to set the last antenna's phase to zero. Furthermore, in some embodiments, the method 250 further evaluates the correlation of the beamforming vectors between neighboring down-sampled subcarriers to determine the phase rotation of the beamforming weights of the antennas to set the last antenna's phase to zero.

In one embodiment, suppose k* is an index of the maximum absolute beamforming weight value, or the maximum absolute amplitude of the beamforming weight, that is:

$$k^* = \max_{k=1 \ldots N_{tx}} |v_{ns,ic}(k)|,$$

where $v_{ns,ic}(k)$ is k's element of vector $v_{ns,ic}$, and the last antenna is denoted by $N_{tx}$.

The method 250 evaluates two conditions to determine how to rotate the phase angle of the beamforming weights for all the antennas. First, the method 250 determines if the correlation value between feedback vectors of neighboring down-sampled subcarriers is greater than a given threshold value (e.g. 0.9 or 0.95). Second, the method 250 determines if the amplitude of the last antenna is smaller than a given threshold value (e.g. 0.1).

More specifically, if the correlation value of the beamforming vectors between neighboring down-sampled subcarriers (Corr=$|v_{ns,ic-1}^H v_{ns,ic}|$) and last antenna's magnitude meet the requirement (for example, Corr>0.95 or Corr>0.9 and $|v_{ns,ic}(N_{tx})|$<0.1), that is, if the correlation value is high while the amplitude of the last antenna's beamforming weight is small, then method 250 rotates all antennas' beamforming weight with respect to the angle difference between the current subcarrier and previous down-sampled subcarrier's phase angle for the k* element, that is, the antenna element having the maximum absolute beamforming weight value. Accordingly:

$$v_{ns,ic} = e^{j \cdot \theta} v_{ns,ic}, \text{ where } \theta = \measuredangle v_{ns,ic-1}(k^*) - \measuredangle v_{ns,ic}(k^*).$$

Then, the method 250 set the phase of the last antenna ($N_{tx}$) to zero by:

$$v_{ns,ic}(N_{tx}) = |\text{real}(v_{ns,ic}(N_{tx}))| \text{ where real}(x) \text{ is real value of } x.$$

In some embodiments, the last antenna's phase can be set by:

$$v_{ns,ic}(N_{tx}) = |v_{ns,ic}(N_{tx})|.$$

If both of the above conditions are not met, that is, the correlation value between neighboring down-sampled subcarriers is not large enough and the amplitude of the last antenna's beamforming weight is not too small, then the method 250 rotates all antennas' beamforming weight with respect to the phase angle of last antenna, that is:

$$v_{ns,ic} = e^{j \cdot \theta} v_{ns,ic}, \theta = \measuredangle_{ns,ic}(N_{tx}).$$

More specifically, when the amplitude of the last antenna's beamforming weight is small, rotating based on the last antenna's phase may result in phase discontinuity, thus breaking channel smoothness. In embodiments of the present disclosure, when the amplitude of the last antenna's beamforming weight is small while the correlation of the beamforming vector between neighboring down-sampled subcarriers is high, the method 250 uses the phase of the beamforming weight with the maximum amplitude as a reference phase. The method 250 rotates the phase of all the antennas using the reference phase. As a result, the phase of all the antennas is aligned with the reference phase, being the phase of the beamforming weight having the largest amplitude. After rotation using the reference phase, if the phase of the last antenna is not zero, the method 250 forces the phase of the last antenna ($N_{tx}$) to zero by setting the beamforming weight to the real part (amplitude) of the last antenna's beamforming weight or by taking the magnitude of the last antenna's beamforming weight.

In the case the amplitude of the last antenna's beamforming weight is not too small or while the correlation between two neighboring down-sampled subcarrier beamforming vectors is not high enough, the method 250 rotates all antennas' beamforming weight with respect to the phase angle of last antenna to set the last antenna's phase to zero.

In the present embodiment, the amplitude of the last antenna's beamforming weight and the correlation value between neighboring down-sampled subcarriers are used to determine the phase rotation methods to use. In other embodiments, the amplitude of the last antenna's beamforming weight or the correlation value between neighboring down-sampled subcarriers can be used to determine the phase rotation method to apply.

The method 250 then performs smoothing on the beamforming feedback matrix thus obtained (260). Because the feedback indices of the beamforming matrix has been down-sampled, the method 250 performs smoothing to fill out the other subcarriers so as to guarantee channel smoothness. In some embodiments, the method 250 performs smoothing for each antenna and each spatial stream. In one embodiment, the method 250 generates a smoothed beamforming feedback matrix using the original feedback granularity, that is, a down-sampled ratio of 1. That is, the feedback matrix for all the subcarriers are generated. The method 250 may further make the resultant smoothed beamforming matrix into a unitary matrix by normalizing each column vector to unit power and making each column vector orthogonal. In one embodiment, the method 250 uses the Gram-Schmidt orthogonalization. As a result, the method 250 generates a smoothed beamforming matrix V including beamforming vectors for all subcarriers.

The method 250 then compresses or quantizes the smoothed beamforming feedback matrix (262). In embodiments of the present disclosure, the method 250 applies compression or quantization techniques known in the art. The compressed beamforming matrix can then be transmitted to the beamformer (264).

The method 250 further evaluates the compressed beamforming matrix and determines whether channel smoothing can be performed even if the beamformee receives beamformed data packets. The method 250 evaluates a metric for the beamforming matrix and determines if the metric is greater than a predetermined threshold (266). In one embodiment, the metric can be the sign-to-noise ratio of the beamforming matrix. In another embodiment, the metric can be a correlation value between neighboring subcarriers. In another embodiment, the metric is a combination of the signal-to-noise ratio and a correlation value. In other embodiments, the metric is the number of spatial streams for feedback.

In embodiments of the present disclosure, the method 250 uses the evaluation of the metric to set a channel smoothing indicator which is coupled to the channel estimation operation. The channel smoothing indicator is fed back to the channel estimation operation to instruct the channel estimation method to perform channel smoothing on the received data packets, regardless of whether the received data packets have been beamformed. In one embodiment, if the beamforming matrix metric exceeds a given threshold, the channel smoothing indicator is set to On (268). On the other hand, if the metric computed for the beamforming matrix is at or below the threshold, the channel smoothing indicator is set to Off (270). The method 250 then provides the channel smoothing indicator to the channel estimation operation (272). The channel estimation operation will be configured to perform channel smoothing when the channel smoothing indicator is set to On. The channel estimation operation will be configured to perform channel smoothing according to information provided by the beamformer when the channel smoothing indicator is set to Off. That is, when the channel smoothing indicator is set to Off, then the channel estimation will not perform channel smoothing when the beamformer indicates to the beamformee that the transmitted data packet has been beamformed and will perform channel smoothing when the beamformer indicates to the beamformee that the transmitted data packet has not been beamformed.

The method 250 completes the computation of the beamforming matrix and the method 250 may be repeated when another channel estimation matrix is received from the channel estimation operation.

In some embodiments, the metric of the beamforming matrix can be compared with a threshold having the opposite polarity—that is, channel smoothing indicator is set to On in response to the metric being equal to or small than the threshold and to Off in response to the metric being greater than the threshold. Furthermore, the metric may be a combination of factors and evaluated using various thresholds. In embodiments of the present disclosure, the threshold used for the beamforming matrix metric can have variable values. In particular, different thresholds may be used for different SNR region. The method 250 in FIG. 6 is illustrative only and not intended to be limiting.

The method 250 in FIG. 6 introduces additional techniques to ensure a smoothed beamforming matrix is generated to guarantee channel smoothness. In particular, the method 250 uses vector swapping and weight-based phase rotation. In other embodiments, one or both of the techniques can be applied to improve the smoothness of the beamforming matrix. That is, vector swapping can be applied independent of the weight-based phase rotation, and vice versa. The method 250 in FIG. 6 incorporating both techniques is illustrative only.

The present disclosure can be implemented in numerous ways, including as a process; an apparatus; a system; a composition of matter; a computer program product embodied on a computer readable storage medium; and/or a processor, such as a hardware processor or a processor device configured to execute instructions stored on and/or provided by a memory coupled to the processor. In this specification, these implementations, or any other form that the present disclosure may take, may be referred to as techniques. In general, the order of the steps of disclosed processes may be altered within the scope of the present disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the present disclosure is provided below along with accompanying figures that illustrate the principles of the present disclosure. The present disclosure is described in connection with such embodiments, but the present disclosure is not limited to any embodiment. The scope of the present disclosure is limited only by the claims and the present disclosure encompasses numerous alternatives, modifications and equivalents. Numerous specific details are set forth in the following description in order to provide a thorough understanding of the present disclosure. These details are provided for the purpose of example and the present disclosure may be practiced according to the claims without some or all of these specific details. For the purpose of clarity, technical material that is known in the technical fields related to the present disclosure has not been described in detail so that the present disclosure is not unnecessarily obscured.

The above detailed descriptions are provided to illustrate specific embodiments of the present disclosure and are not intended to be limiting. Numerous modifications and variations within the scope of the present disclosure are possible. The present disclosure is defined by the appended claims.

What is claimed is:

1. A method comprising:
   receiving a channel estimation matrix characterizing a communication channel between a wireless station and an access point, the channel estimation matrix being associated with a plurality of feedback indices relating to a plurality of subcarriers;
   determining a beamforming matrix using the channel estimation matrix, the beamforming matrix being generated for a plurality of down-sampled feedback indices being a subset of the plurality of feedback indices; the beamforming matrix including beamforming weights for one or more antennas among a plurality of antennas associated with the access point, each beamforming weight being a complex value including an amplitude and a phase;
   setting the phase of the beamforming weight for a last antenna associated with the last row index of the beamforming matrix to zero and rotating the phase of each beamforming weight for each of the other antennas;
   performing smoothing of the beamforming matrix for each feedback index by normalizing each column vector of the beamforming matrix;
   compressing the smoothed beamforming matrix;
   determining to selectively apply channel smoothing to the channel estimation matrix by evaluating the compressed smoothed beamforming matrix based on a metric of the beamforming matrix; and
   providing the smoothed beamforming matrix as output.

2. The method of claim 1, wherein providing the smoothed beamforming matrix as output comprises:
   transmitting the smoothed beamforming matrix to the access point.

3. The method of claim 1, wherein determining, at the wireless station, the beamforming matrix comprises:
   decomposing the channel estimation matrix using a beamforming algorithm.

4. The method of claim 3, wherein decomposing the channel estimation matrix using a beamforming algorithm comprises:
   decomposing the channel estimation matrix using singular value decomposition, wherein the beamforming matrix is formed by the right singular vectors of the decomposed channel estimation matrix.

5. The method of claim 3, wherein decomposing the channel estimation matrix using a beamforming algorithm comprises:
   decomposing the channel estimation matrix using geometric mean decomposition.

6. The method of claim 1, further comprising:
   determining a first phase value of the beamforming weight for the last antenna;
   rotating the phase of each beamforming weight of each antenna using the first phase of the beamforming weight for the last antenna; and
   setting the phase of the beamforming weight for the last antenna to zero as a result of the rotating.

7. The method of claim 1, further comprising:
   determining an amplitude of the beamforming weight for the last antenna;
   in response to the amplitude being less than a first threshold, determining a second phase value of a beamforming weight having a maximum amplitude among the beamforming weights of the plurality of antennas;

rotating the phase of each of the beamforming weight of the plurality of antennas except the last antenna using the second phase value; and setting the phase of the beamforming weight for the last antenna to zero.

8. The method of claim 1, further comprising:

determining a correlation value between beamforming matrices associated with neighboring down-sampled subcarriers;

in response to the correlation value being greater than a second threshold, determining a second phase value of a beamforming weight having a maximum amplitude among the beamforming weights of the plurality of antennas;

rotating the phase of each of the beamforming weight of the plurality of antennas except the last antenna using the second phase value; and setting the phase of the beamforming weight for the last antenna to zero.

9. The method of claim 1, further comprising:

determining correlation values of beamforming matrices between neighboring down-sampled subcarriers;

arranging column vectors of the beamforming matrix of a first subcarrier based on the determining, the column vectors being arranged based on the correlation values between the neighboring down-sampled subcarriers.

10. The method of claim 1, further comprising:

in response to the metric being in a first range, setting the channel smoothing indicator to on;

providing the channel smoothing indicator to apply the channel smoothing to the channel estimation matrix;

in response to the metric being in a second range, setting a channel smoothing indicator to off; and providing the channel smoothing indicator to not apply the channel smoothing to the channel estimation matrix.

11. The method of claim 1, wherein
the metric of the beamforming matrix includes a signal-to-noise ratio of the beamforming matrix.

12. The method of claim 1, wherein
the metric of the beamforming matrix includes a correlation value of beamforming vectors between neighboring subcarriers in the beamforming matrix.

13. The method of claim 1, wherein
the metric of the beamforming matrix includes a number of spatial streams for feedback as the metric.

14. A wireless station comprising:

a processor; and a memory coupled with the processor, wherein the memory is configured to provide the processor with instructions which when executed cause the processor to:

receive a channel estimation matrix characterizing a communication channel between the wireless station and an access point, the channel estimation matrix being associated with a plurality of feedback indices relating to a plurality of subcarriers;

determine a beamforming matrix using the channel estimation matrix, the beamforming matrix being generated for a plurality of down-sampled feedback indices being a subset of the plurality of feedback indices; the beamforming matrix including beamforming weights for one or more antennas among a plurality of antennas associated with the access point, each beamforming weight being a complex value including an amplitude and a phase;

set the phase of the beamforming weight for a last antenna associated with the last row index of the beamforming matrix to zero and rotating the phase of each beamforming weight for each of the other antennas;

perform smoothing of the beamforming matrix for each feedback index by normalizing each column vector of the beamforming matrix;

compress the smoothed beamforming matrix;

determine to selectively apply channel smoothing to the channel estimation matrix by evaluating the compressed smoothed beamforming matrix based on a metric of the beamforming matrix; and provide the smoothed beamforming matrix as output.

15. The wireless station of claim 14, wherein the memory is further configured to provide the processor with instructions which when executed cause the processor to:

transmit the smoothed beamforming matrix to the access point.

16. The wireless station of claim 14, wherein the memory is further configured to provide the processor with instructions which when executed cause the processor to:

decompose the channel estimation matrix using singular value decomposition, wherein the beamforming matrix is formed by the right singular vectors of the decomposed channel estimation matrix.

17. The wireless station of claim 14, wherein the memory is further configured to provide the processor with instructions which when executed cause the processor to:

determine an amplitude of the beamforming weight for the last antenna;

in response to the amplitude being less than a first threshold, determine a second phase value of a beamforming weight having a maximum amplitude among the beamforming weights of the plurality of antennas;

rotate the phase of each of the beamforming weight of the plurality of antennas except the last antenna using the second phase value; and set the phase of the beamforming weight for the last antenna to zero.

18. The wireless station of claim 14, wherein the memory is further configured to provide the processor with instructions which when executed cause the processor to:

determine a correlation value between beamforming matrices associated with neighboring down-sampled subcarriers;

in response to the correlation value being greater than a second threshold, determine a second phase value of a beamforming weight having a maximum amplitude among the beamforming weights of the plurality of antennas;

rotate the phase of each of the beamforming weight of the plurality of antennas except the last antenna based on the second phase value; and set the phase of the beamforming weight for the last antenna to zero.

19. The wireless station of claim 14, wherein the memory is further configured to provide the processor with instructions which when executed cause the processor to:

in response to the metric being in a first range, set the channel smoothing indicator to on;

provide the channel smoothing indicator to apply the channel smoothing to the channel estimation matrix;

in response to the metric being in a second range, set a channel smoothing indicator to off; and provide the channel smoothing indicator to not apply the channel smoothing to the channel estimation matrix.

20. The wireless station of claim 19, wherein the metric of the beamforming matrix includes a signal-to-noise ratio of the beamforming matrix.

\* \* \* \* \*